United States Patent Office 3,443,475
Patented May 13, 1969

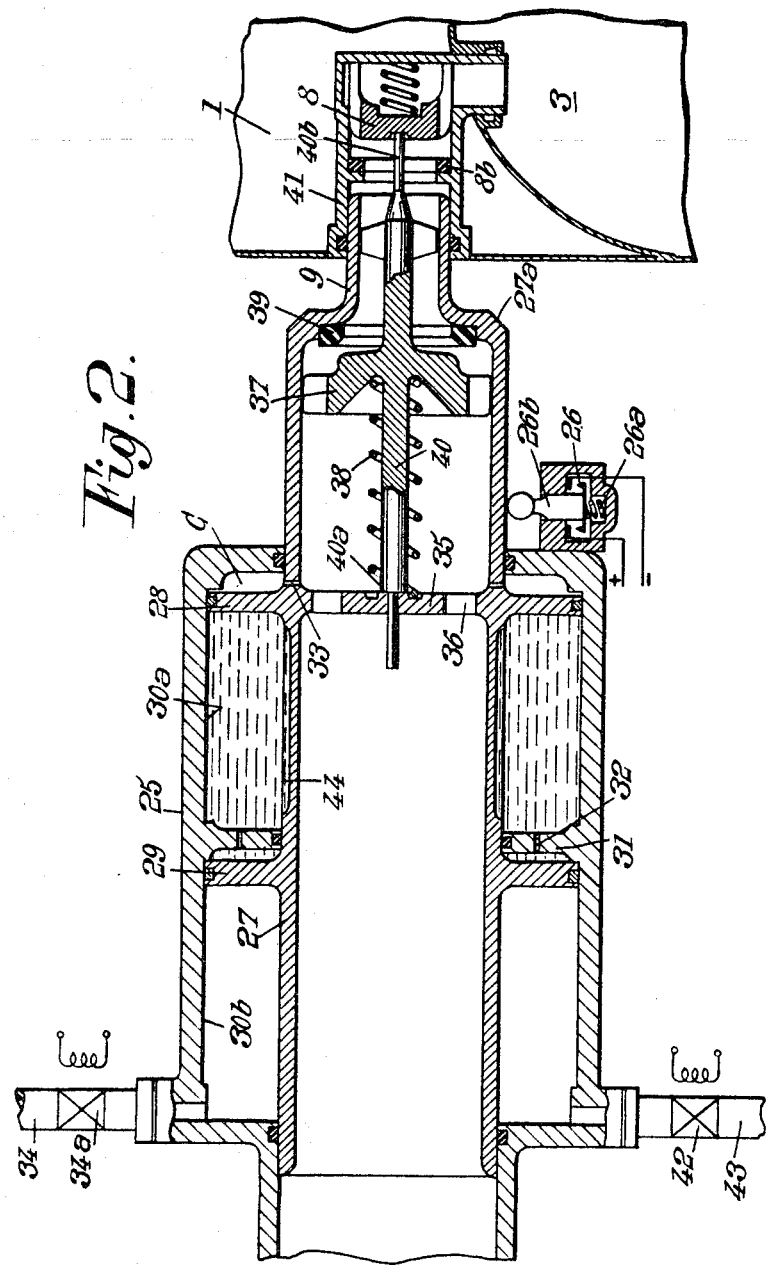

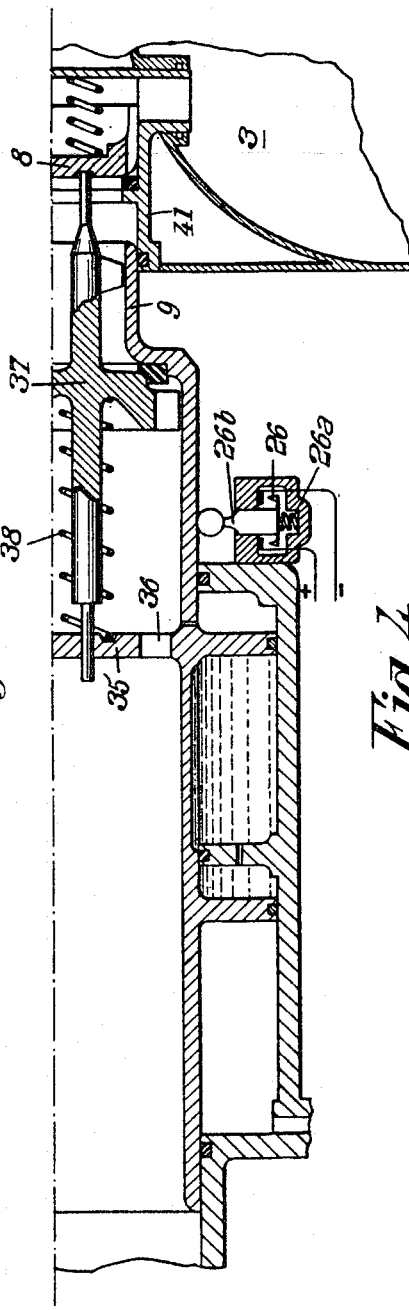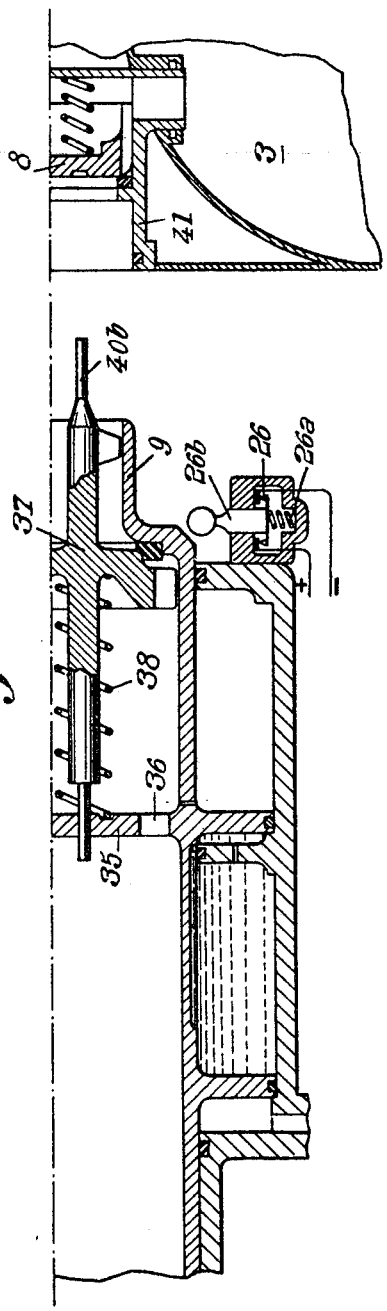

1

3,443,475
MISSILES, INCLUDING AT LEAST ONE GAS GENERATOR MAKING USE OF AT LEAST ONE LIQUID PROPELLANT COMPONENT PLACED UNDER THE ACTION OF A DRIVING GAS AND IN PLANTS FOR LAUNCHING SUCH MISSILES
Pierre Berton, Boulogne-sur-Seine, France, assignor to Office National d'Etudes et de Recherches Aerospatiales (par abreviation: O.N.E.R.A.), Chatillon-sous-Bagneux, France
Filed Dec. 27, 1966, Ser. No. 606,517
Claims priority, application France, Dec. 30, 1965, 44,317
Int. Cl. F41f 3/04
U.S. Cl. 89—1.8
4 Claims

ABSTRACT OF THE DISCLOSURE

A solid liquid propellant rocket is provided with a propellant liquid component tank placed under the direct pressure of a driving gas under pressure. In order to fill this tank from a launching station, use is made of a storing tank belonging to this launching station and containing the amount of liquid component to be placed in said rocket tank. Transfer of this amount of liquid componont from the storing tank to the rocket tank is performed under the action of a driving gas fed from a tank located at the launching station, this transfer of liquid being followed immediately by a transfer through the same channel of the driving gas into the rocket tank.

The present invention relates to systems comprising: On the one hand, a missile including at least one gas generator making use, for its operation, of at least one liquid component of a hybrid propellant housed in a tank carried by the missile and in which said liquid component is directly subjected to the action of a compressed gas, hereinafter called "driving gas," intended gradually to drive said liquid component into the combustion chamber of said gas generator, and, on the other hand, a launching plant for such a missile.

It should be well understood that the term "gas generator" is used in a very broad meaning and may designate, in particular, either a rocket engine acting as main or auxiliary propelling plant for the missile or a rocket engine used for guiding or stabilizing purposes, or again a mere device for feeding gas under pressure to one or several elements carried by the missile and requiring, for their operation, gas under pressure.

The present invention is more especially concerned with systems wherein the missile to be launched is a rocket the propelling device of which includes a solid component of a hybrid propellent located in the combustion chamber of said system and a liquid component of this hybrid propellent, preferably hypergolic with said solid component, carried by the missile and subjected to the direct pressure of a driving gas so as to be gradually delivered into said combustion chamber. Such rockets may be used, in particular, for meteorological purposes.

The chief object of the present invention is to provide a system which is better adapted to meet the requirements of practice and, in particular, which is such that the weight of the missile can be reduced to a minimum and the launching plant permits of performing under the best possible conditions of safety and rapidity some operations preliminary to the launching of the missile, same as the launching proper.

According to the present invention the launching plant is arranged in such fashion that, on the one hand, the missile to be launched comprises a tank adapted to receive the charge of liquid component that must be carried

2 by the missile and also a corresponding charge of initial driving gas, this tank, which must of course be capable of supporting the pressures exerted by the driving gas during a period of time depending upon the time of of operation of the gas generator, being adapted to resist corrosion by the liquid component for a relatively short time, which must only exceed said duration of operation by a minimum amount, on the other hand, the launching plant comprises a replaceable tank, hereinafter called "storing tank," capable of supplying an amount of liquid component corresponding to the charge of said liquid component to be carried along by the missile, this storing tank being capable, not only of resisting pressures of the same order of magnitude as those developed in the missile tank, but also of resisting the corrosion action of the liquid component during long periods (considerably longer than those for which the missile tank is made) whereby the liquid component can be stored in this storing tank before the latter is incorporated into the missile, and furthermore, an amount of liquid component contained in the storing tank and corresponding to the charge that must be carried along by the missile is transferred into the missile tank by the direct action, in said storing tank, of driving gas under pressure delivered from a source of driving gas under pressure belonging to the launching plant, this transfer of the liquid component charge into the missile tank being immediately followed by a transfer, through the same channel, of the corresponding charge of driving gas into the missile tank, the total time necessary for both of the successive transfers determining the above mentioned minimum amount.

A second feature of the present invention consists in providing the launching system with a fluid control apparatus capable of controlling the sequence of at least some of the operations that are to precede the launching of the missile once it has been placed in the launching system, the energy necessary for actuating said apparatus being supplied by a source of driving gas under pressure included in said plant and serving also to supply the gas generator of the missile with initial driving gas.

A preferred embodiment of the present invention will be hereinafter described with reference to the appended drawings, given merely by way of example, and in which:

FIG. 1 diagrammatically shows a rocket launching plant made according to the present invention;

FIG. 2 shows, on an enlarged scale, and in axial section, a fluid operated apparatus for successively filling the rocket tank with liquid component and driving gas, then for releasing said rocket and, finally, for starting the operation thereof, said apparatus being shown, in FIG. 2, in the position where it is filling the rocket tank with liquid component;

FIGS. 3 and 4 are half sectional views of the same apparatus, respectively at the end of the filling with driving gas and at the time where the rocket operation is started;

Figure 5:
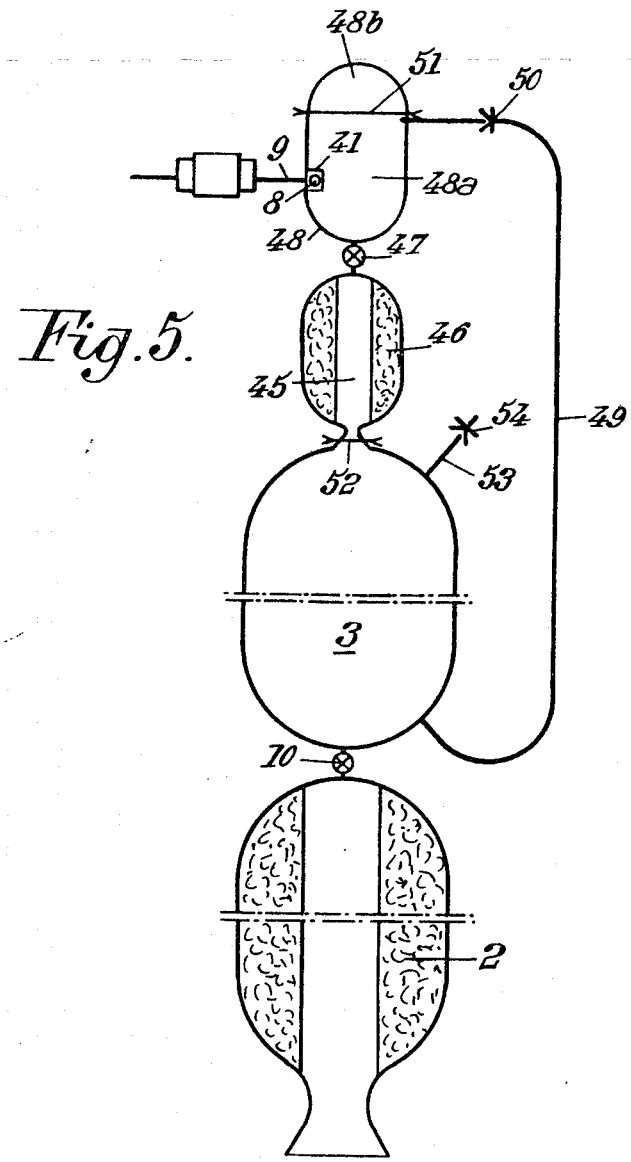

FIG. 5 diagrammatically shows another kind of rocket capable of forming, together with its launching plant, a system according to the invention.

The system to be constituted comprises: on the one hand a rocket 1, for instance to be used for meteorological purposes, fitted with a propelling device of the rocket engine type making use of a solid component 2 (which will be supposed to be a fuel) housed in the combustion chamber of the engine and of a liquid component (an oxidizer) preferably hypergolic with said solid component 2, said liquid component being located in a tank 3 of the rocket where it is subjected to the direct pressure of the compressed driving gas (nitrogen or air for instance) intended gradually to drive the liquid component into the combustion chamber of the propelling system, and on the other hand, a plant for launching such a rocket.

It is known that the liquid oxidizers used in such rocket engines (consisting generally of nitric acid, nitrogen peroxide, fluorine compounds, and the like) generally have a high agressivity with respect to some metals and in particular metals having a high mechanical resistance.

It is also known that any gain in weight of such a rocket, in particular in the weight of the oxidizer tank 3, is particularly important, since it results in an improvement of the rocket performance.

The oxidizer tank 3 must therefore, while being as light as possible, be capable of resisting the high pressures exerted by the driving gas and, at least as long as the oxidizer is present in said tank 3, be capable of resisting the corrosive action of said oxidizer.

The chief object of the present invention is to comply with these conditions, while improving the rapidity and the safety of the launching process.

The launching plant advantageously comprises, as shown: a launching station L comprising, among other elements, a launching structure 4 capable of holding the rocket in launching position while permitting of its being launched after its operation has been started, which result can be obtained, for instance, by providing said launching structure 4 with a bearing receptacle 4a wherein the rocket 1 is resting and with an upper holding hook open upwardly and in which is engaged a projection 1b of the rocket, and a shielded firing station T located at some distance from the launching station L and where are located the control apparatus which are to be operated to produce the successive operations necessary for launching the rocket.

According to the present invention, such a system is arranged in such manner that, on the one hand, the rocket tank 3 intended to contain the oxidizer is capable of withstanding, on the one hand, at least the pressures developed by the driving gas, and on the other hand, the corrosive action of the oxidizer for a time which is relatively short but is however greater than the time of operation of the rocket propelling plant by a minimum amount which will be hereinafter specified and which depends upon the time required for filling tank 3 with the oxidizer and with the driving gas, on the other hand, the launching station L comprises a replaceable storing tank 5 capable of dosing a charge of liquid oxidizer 6 corresponding to the amount that must be placed in tank 3, which storing tank 5 may in particular perform this function by containing an amount of oxidizer corresponding to the charge that must be carried along by the rocket; said storing tank 5 is capable of resisting the pressure of the driving gas and the corrosive action of the liquid oxidizer 6 for long periods of time (substantially greater than those for which the rocket tank 3 has been provided) so as to permit of filling the storing tank much before it is mounted at the launching station L, and furthermore, the amount of fuel 6 to be delivered to the rocket tank 3 is transferred from storing tank 5 to rocket tank 3 by the direct action, in storing tank 5, of driving gas under pressure delivered from a source 7 (for instance a tank containing the gas under pressure) located at station L, this transfer of the charge of liquid oxidizer 6 being immediately followed by a transfer, through the same channel, of the corresponding charge of driving gas into rocket tank 3, the total time necessary for these two successive transfers determining the above mentioned minimum supplementary amount.

Owing to this arrangement it will be possible to adopt, for rocket tank 3, a material having a high mechanical resistance, the fact that such materials have a low resistance to corrosion being not an obstacle in this case since tank 3 is subjected to corrosion for only a short time, whereby the walls of said tank 3 need not be made too thick (and therefore too heavy), the loss of thickness of said walls due to corrosion being extremely small, and for the construction of storing tank 5, a material having a high resistance to corrosion, the fact that such materials generally have a relatively low mechanical resistance being not an obstacle in this case since the tank remains on the ground and its weight is not an important factor, whereby it will be possible to increase the thickness of the wall until the desired mechanical resistance is obtained.

By way of example, it may be pointed out that, when the liquid oxidizer is nitric acid and the driving gas is at a pressure of 90 bars, the total time for which the fuel is to remain in the rocket tank being of the order of one minute, satisfactory results were obtained with a rocket tank made of high resistance steel (for instance "maraging" steel) of a thickness of about $8/10$ of a millimeter, the storage tank being made of a light alloy of aluminum, zinc and magnesium (for instance "Zicral") of a wall thickness of about 15 mm., this last mentioned tank permitting storing of nitric acid for at least one year.

In addition to the advantages above mentioned, a system made as above stated permits of performing in one single operation, by means of a single circuit starting from the source 7 of driving gas and leading to the rocket tank 3, both the filling of the tank with oxidizer and the filling with driving gas. This result is obtained without the necessity of using special apparatus (such as transfer pumps for corrosive liquids) or an external source of energy (for instance with an electric motor). Furthermore the double operation above mentioned is performed in a continuous manner and within a short time, which reduces the time period for which the rocket engine 3 must be capable of resisting corrosion.

Of course it will be necessary to provide some valve, measurement and telecontrol apparatus.

Figure 1:
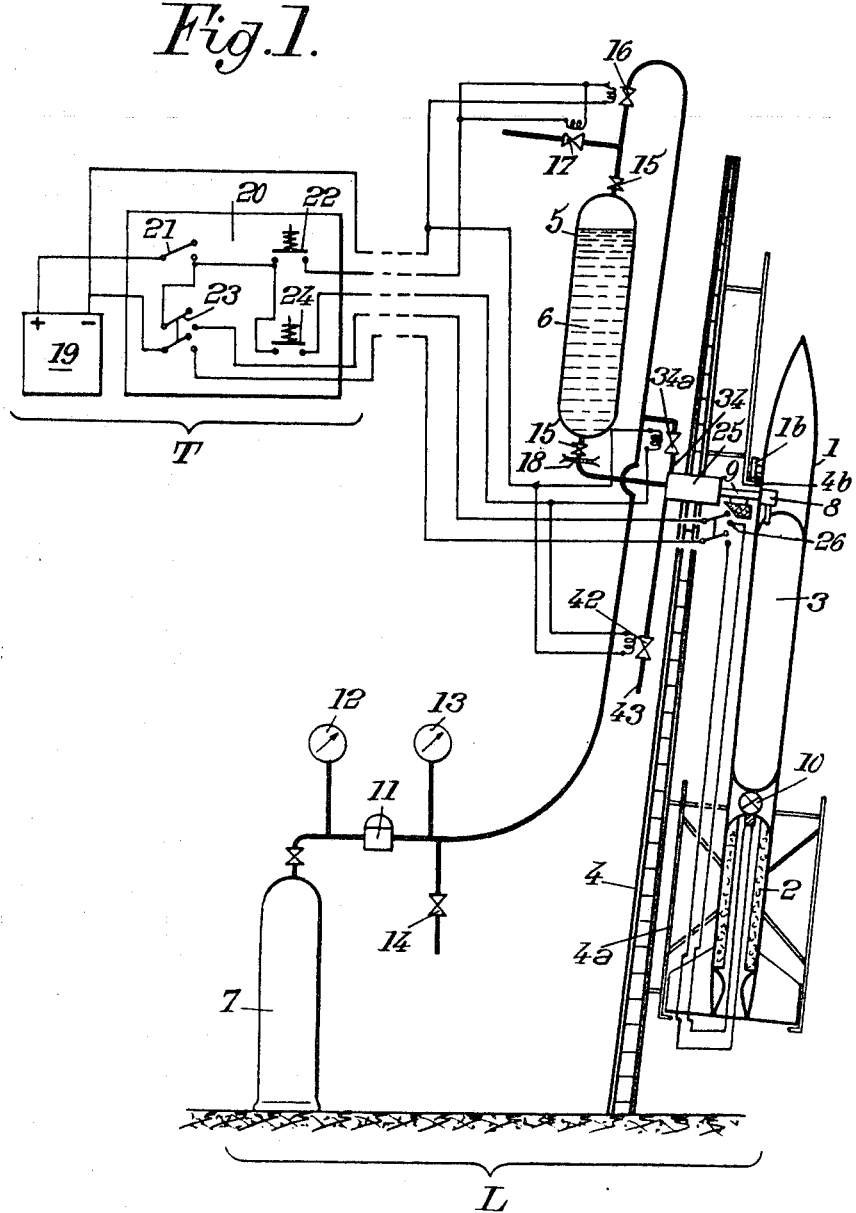

For this purpose, use is made of the construction of FIG. 1.

Rocket 1 is provided, at the upstream end of tank 3, with a self closing valve 8 which may be engaged by a filling nozzle 9 connected to the downstream end of storing tank 5. The downstream end of tank 3 is provided with an electrically controlled valve 10 which, when it is opened, permits oxidizer to be fed to the combustion chamber of the rocket propelling device.

The launching station L includes: on the side of driving gas tank 7, an adjustable pressure reducing device 11 on the respective sides of which are provided an upstream control pressure gauge 12 and a downstream control pressure gauge 13, downstream of which there is provided a hand controlled pressure release valve 14, and on the side of storing tank 5, hand operated branching valves 15 provided at both ends of said tank, an electrically controlled valve 16 for the feed of driving gas to said tank 5 (valve 16 being arranged to be open when it is fed with electric current), an electrically controlled valve 17 for connection with the atmosphere, branched in shunt between valve 16 and the upstream branch valve 15 (this electrically controlled valve 17 being arranged to be closed when it is placed under voltage), and a burst diaphragm 18 disposed downstream of branch valve 15 and corresponding to a pressure of 30 bars if it is supposed that this value is lower than the initial pressure required for the driving gas in the tank (for instance 90 bars).

Concerning now firing station T, it includes a source of electrical voltage such for instance as a storage battery 19 and a control desk 20 on which are mounted the control switches of the elements above mentioned, to wit a general switch 21, a push-piece contactor 22 for placing electric valves 16 and 17 under voltage, a rocket starting two-pole switch 23 for controlling the valve 10 of tank 3, and a push-piece contacter 24 intended to control, in a manner which will be hereinafter specified, the opening of the valve 8 of the rocket tank 3 when said tank is to be emptied because the firing of the rocket is temporarily stopped.

According to another feature of the invention the device above described further comprises a fluid controlled apparatus (as diagrammatically illustrated at 25 in FIG. 1) disposed on launching structure 4, downstream of filling nozzle 9, this apparatus 25 being intended automatically to perform the following operations: First to retract said nozzle once the complete amounts of fuel and driving gas have been fed to the rocket. Then to stop the filling circuits and, preferably, to fire the rocket by actuating a switch 26 mounted in series in the circuit connecting push-piece contactor 23 with electrically controlled valve 10.

This apparatus 25, which is actuated by the pressure of the driving gas, is preferably arranged in such manner as to include, for the displacement of its movable parts, a working chamber into which the fluid passing through the apparatus (oxidizer, then driving gas) can pass through passages of restricted cross section area producing a pressure drop which is much greater when the fluid flowing through said apparatus is the liquid oxidizer than when said fluid is the filling gas. The pressure rise which is produced in the working chamber when the driving gas replaces the liquid oxidizer is then used to produce the desired displacement of the movable parts of the apparatus. These displacements produce, in the case that is considered, the release of the self closing valve 8 of rocket tank 3 by closing a valve provided in nozzle 9, by retracting said nozzle and finally by starting the rocket engine.

The fluid control apparatus 25 is advantageously of the type illustrated by FIG. 2.

According to this construction, nozzle 9 is formed by an extension of a sliding tube 27 connected in a fluid-tight manner with the filling circuit and provided, on the outside thereof, with two annular pistons 28 and 29 located at a distance from each other and disposed, respectively, in two annular chambers 30a and 30b belonging to a single fixed part (designated by reference numeral 25) which constitutes the casing of the apparatus, the transverse partition 31 located between said chambers 30a and 30b being provided with calibrated orifices 32.

The wall of sliding tube 27 is provided, immediately beyond annular piston 28 on the right hand side thereof, with an annular set of orifices 33 connecting the inside of said tube 27 with the portion of annular chamber 30a located on the right hand side of piston 28, said chamber portion constituting the working chamber C of the apparatus.

The other portion of annular chamber 30a, and also the portion of annular chamber 30b extending between piston 29 and transverse partition 31, are filled with liquid, these two chamber portions communicating together through calibrated orifices 32 and acting as the transfer chambers of a dashpot device.

The portion of annular chamber 30b located on the left hand side of piston 29 communicates with the source 7 of driving gas through a conduit 34 provided with electric valve 34a open when current is supplied thereto.

Tube 27 includes a transverse diaphragm 35 in which are provided holes 36 producing a pressure drop in the stream of fluid compelled to flow through said holes.

In this tube 27, downstream of diaphragm 35 there is provided a valve 37 subjected to the action of a spring 38 urging it toward its seat 39, carried by tube 27 at a distance from the downstream end of nozzle 9.

An axial rod 40 rigid with valve 37 carries, near its upstream end, a shoulder 40a adapted to cooperate with diaphragm 35 to limit the opening stroke of said valve 37. Near its downstream end, said rod 40 forms a push-piece 40b projecting downstream of nozzle 9 when valve 37 is in its fully opened position. This push-piece 40b is intended to move the self closing valve 8 of tank 3 away from its seat 8b when nozzle 9 is engaged into the connecting conduit 41 of said tank 3.

Finally, in order to prevent any risk of blocking of the sliding part of the apparatus (in particular in case of accidental leakage part electric valve 34a) there is provided, in connection with the control circuit of said electric valve 34a (which circuit is controlled by push-piece contactor 24), an electric valve 42 placed under electric voltage and disposed in a relief conduit 43 in communication with annular chamber 30b.

The operation is as follows, nozzle 9 being supposed to be fully engaged into the connecting conduit 41 of tank 3, as shown by FIG. 2.

Due to this engagement, valve 8 and check valve 37 are pushed into their fully opened positions against the action of their respective return springs. As soon as storing tank 5 is placed under pressure, diaphragm 18 bursts and the liquid oxidizer contained in said storing tank 5 enters apparatus 25, flows through sliding tube 27 and past diaphragm 35 and valves 37 and 8 so as finally to enter tank 3.

The transverse surfaces of the sliding unit are determined in such manner that, account being taken of the pressure drop due to the holes 36 of diaphragm 35, the resultant force acting upon the sliding unit exerted by the fuel pressure downstream of said diaphragm and directed in the upstream direction is lower than the resultant force applied to said sliding unit by the pressure of the oxidizer (much higher than the downstream pressure) existing upstream of said diaphragm.

In these conditions, the movable parts of the apparatus remain in the relative positions shown by FIG. 2 as long as the liquid oxidizer flows through tube 27 and nozzle 9.

As soon as this flow of liquid has ceased, the fluid passing through sliding tube 27 is the driving gas under pressure. In this case, the pressure drop due to the holes 36 of diaphragm 35 is much lower than in the preceding case where the flowing fluid was the oxidizer liquid. This causes an increase of the pressure downstream of said diaphragm 35, and therefore of the pressure in working chamber C, which results into an increased thrust toward the left on the transverse surfaces of the sliding unit.

The arrangement of the transverse surfaces of the sliding unit, which are subjected respectively to the upstream and downstream pressures, is such that this increased thrust overcomes the thrust exerted by the upstream pressure on the transverse surfaces of the sliding unit.

In these conditions the sliding unit moves, under the effect of a differential pressure, in the direction for which nozzle 9 tends to retract, toward the left, from connecting conduit 41, this movement being braked by the dash-pot effect corresponding to the flow of oil through the orifices 32 of transverse partition 31. This movement toward the left of the sliding unit causes first the closing of the rocket valve 8, then the closing of the valve 37 of apparatus 27 (the resilient means for returning valve 37 into closing position must be less powerful than the means for returning valve 8 into closing position). Nozzle 9 remains however slightly engaged in connecting conduit 41 as shown by FIG. 3.

The rearward movement of the sliding unit goes on until nozzle 9 and the projecting portion of push-piece 40b are fully disengaged, as shown by FIG. 4.

On the other hand, the apparatus is advantageously arranged in such manner that, when the feed of driving gas has been completed (the pressures in tank 3 and in apparatus 25 having become substantially equal to each other), valves 8 and 37 are still partly open.

It should be noted that, if it is desired to accelerate the end of the rearward stroke of the sliding unit, it suffices to provide, in the external wall of sliding tube 27, between pistons 28 and 29, longitudinal grooves 44 adapted to short circuit holes 32 and directly to connect together the spaces located on opposite sides of transverse partition 31.

Finally, in order to ensure ignition of the rocket at the end of the backward stroke of the sliding unit, ignition switch 26 is controlled by sliding tube 27 in such manner that said switch 26 is closed as soon as sliding tube 27 and push-piece 40b are fully disengaged from connecting conduit 41.

For this purpose, as shown by FIGS. 2 to 4, switch 26 is urged toward its closed position by a spring 26a and it may be moved away from said closed position by a rolling push-piece 26b bearing against sliding tube 27. The latter is provided, near its downstream end, with an inclined guide 27a disposed in such manner that, when push-piece 26b is located opposite said inclined guide 27a due to the rearward movement of tube 27, said push-piece 26b is moved by spring 26a to close ignition switch 26.

Of course inclined portion 27a must be so located as to act once nozzle 9 and push-piece 40b are fully disengaged (position illustrated by FIG. 4).

Such as system works as follows:

Rocket 1 is set on launching structure 4, tank 3 being then empty. Pressure reducing device 11 is adjusted to the value desired for the initial driving pressure. Filling nozzle 9 is fully engaged into connecting conduit 41. This engagement is obtained by acting upon the safety general switch 21 and upon push-piece contactor 24 in such manner as to place chamber 30b under pressure. This causes the movable unit to be displaced toward the left, thus opening the check valve 8 of tank 3 and the check valve 37 of the launching plant (position shown by FIGS. 1 and 2). When push-piece contactor 24 is released, chamber 30b is discharged and nozzle 9 remains in position due to the friction that exists due, in particular to the different packing joints. The main safety switch 21 is then reopened.

Storing tank 5, set at the launching station, is connected respectively with tank 7 and with the fluid control apparatus 25 for the feed of nozzle 9.

Then are performed, the opening of the valves 15 of storing tank 5, and the branching of the electric igniting line between rocket 1 and switch 26, these operations being performed manually at launching station L, after which all persons present at this station are evacuated, the subsequent operations being performed from firing station T, which is protected.

These subsequent operations are the following ones: closing of switches 21 and 23, which places under voltage, respectively, push-piece contactors 22 and 24, which are still open, and firing switch 26, which is also still open, and closing of push-piece contactor 22 which places under voltage the circuit controlling electric valves 16 and 17, this closing of contactor 22 opening electric valve 16 and closing electric valve 17, thus starting the filling of the rocket tank first with liquid oxidizer and then with driving gas, and, finally, firing of the rocket when switch 26 is closed.

The whole of the operations effected from the firing station requires but a very short time, of the order of fifteen seconds in actual practice.

In view of the fact that it is the length of this time period which is the factor determining the resistance of tank 3 to corrosion, it will be understood that this time should be as short as possible.

Anyway, whether the rocket is effectively launched, or whether, for some reason, it must be delayed, the operator releases push-piece contactor 22, which cuts off the control circuit of electric valves 16 and 17 and, therefore, causes electric valve 16 to be closed and electric valve 17 to be opened. Therefore, storing tank 5 is then cut off from reserve tank 7 and said storing tank 5 is emptied by the action of electric valve 17.

If launching is to be delayed, it is necessary to cancel the pressure in tank 3, that is to say to evacuate most of the driving gas contained in said tank 3. For this purpose, the operator closes push-piece switch 24, which opens electric valve 34a and closes electric valve 42. Cylinder 30b is thus connected with the reserve of driving gas in tank 7 and sliding tube 27 is moved outwardly until nozzle 9 is fully engaged in connecting conduit 41, which results in the opening of valves 8 and 37. The parts of apparatus 25 are then in the same positions as for filling tank 3, that is to say in the positions of FIG. 2, but, this time, the apparatus is no longer connected with the driving gas tank and communicates with the atmosphere through storing tank 5, itself placed in the discharge position as above explained by electric valve 17. Therefore the amount of driving gas producing a compression in tank 3 is evacuated through apparatus 25, storing tank 5 and electric valve 17.

Finally, in order to be able to have access to launching station L under perfect conditions of safety, it suffices to open general switch 21.

The arrangement of FIG. 5 is relative to the case where the rocket to be launched comprises, as in the preceding embodiment, a tank 3 intended to receive a liquid oxidizer to be delivered gradually past a valve 10 to a combustion chamber provided with a solid fuel 2 hypergolic with said liquid oxidizer, tank 3 being placed under pressure by a driving gas produced, on board the rocket itself, by a gas generator making use of a solid component and a liquid component of a hybrid propellent, the latter component being the same as that located in tank 3. The last mentioned gas generator essentially comprises a combustion chamber 45 located in a fuel 46 hypergolic with the above mentioned liquid oxidizer, this chamber 45 being fed with liquid oxidizer, past a valve 47, from an oxidizer tank 48 distinct from that located in the rocket.

In order to obtain the desired operation, the system includes the following elements:

(a) A pipe 49 connecting the upstream portion of tank 48 with the downstream portion of tank 3, this pipe 49 being provided with an automatic closing check valve 50, (b) A burst diaphragm 51 disposed in tank 48, slightly upstream of the outlet of pipe 49, this diaphragm 51 dividing said tank into two chambers, to wit a downstream chamber 48 and an upstream chamber 48b, (c) A burst diaphragm 52 disposed between combustion chamber 45 and tank 3, and (d) An air exhaust pipe 53 controlled by a valve 54 the closing of which is controlled by the closing of valve 50.

In order to fill up tanks 3 and 48 with liquid oxidizer and also to feed driving gas into tank 48, use may be made of a launching plant such as that above described, in which filling nozzle 9 is engaged into a connecting conduit 41 provided with a closing check valve 8 provided on the tank 48 of the above mentioned gas generator.

The operation of such a plant, once the filling operations have been started is then as follows:

The liquid oxidizer first fills up the chamber 48a of tank 48, after which tank 3 receives its load of liquid oxidizer through pipe 49. Once these two tanks have been filled with liquid oxidizer under a given pressure, the pressure of the driving gas is increased in such manner as to close valve 50. This closing causes that of check valve 54 which, up to then, had been open. The pressure of the driving gas is then increased until it causes the diaphragm 51 of tank 48 to burst, which causes the filling with driving gas at the last mentioned pressure of the chamber 48b of tank 48, withdrawal of nozzle 9 and firing taking place as in the first mentioned embodiment.

The initial charge of driving gas introduced into the tank carried by the rocket might constitute only a portion of the driving gas which is to place under pressure the liquid component contained in this tank, the remainder of the driving gas being supplied from another source of gas under pressure located on board of the missile (tank containing gas under pressure or gas generator for instance).

What I claim is:

1. The improved combination of a missile and a launching plant for said missile, said missile comprising at least one gas generator wherein at least one liquid component of a hybrid propellent is to be gradually driven by the action of a driving gas onto a solid component of said hybrid propellent with which said liquid component cooperates, wherein:

the missile comprises a tank adapted to contain a charge of said liquid component and also a corresponding charge of gas for driving said liquid component onto said solid component, this tank being capable of supporting the pressure exerted by the driving gas and of resisting corrosion by the liquid component for the time of operation of the missile;

the launching plant comprises a replaceable storing tank for supplying a charge of said liquid component to said missile tank, this storing tank being capable of resisting the corrosive action of the liquid component during long periods, whereby the liquid component can be stored in this storing tank before the latter is incorporated into the launching plant;

a channel is provided in two parts, namely a launching plant part and a missile part, from said storing tank to said missile tank, through which channel said charge of liquid component contained in the storing tank is transferred into the missile tank by the direct action, in said storing tank, of driving gas under pressure delivered from a source of driving gas under pressure belonging to the launching plant, this transfer being immediately followed by a transfer, through said same channel, of the corresponding charge of driving gas into the missile tank;

said launching plant comprises a fluid controlled apparatus having a fluid flow passage therethrough forming part of the launching plant part of said channel, so that said liquid component and said driving gas pass through said fluid flow passage of said fluid controlled apparatus;

said fluid controlled apparatus comprises on the one hand a nozzle having a coupling position in which it establishes coupling between the launching plant part of said channel and the missile part of said channel, and a retracted position in which it no longer establishes this coupling and on the other hand a valve disposed in said fluid flow passage to divide said fluid flow passage into an upstream portion and a downstream portion with respect to the flow of fluid, said valve having an open position in which it establishes communication between said upstream and downstream portions, and a closed position in which it cuts off communication between said upstream and downstream portions;

and said fluid controlled apparatus is actuated by the driving gas passing through said fluid flow passage of said fluid controlled apparatus after the passage therethrough of said liquid component, to retract said nozzle and to close said valve.

2. A combination according to claim 1 wherein said fluid controlled apparatus, on being actuated by the driving gas passing through its fluid flow passage after the passage therethrough of said liquid component, ignites the missile propelling device.

3. A combination according to claim 1 wherein said fluid controlled apparatus comprises a transverse diaphragm disposed in said fluid flow passage, said diaphragm being provided with holes of restricted cross-section through which both said liquid component and said driving gas are compelled to flow in turn, said holes producing a pressure drop that is much greater when said liquid component is passing therethrough than when said driving gas is passing therethrough, said fluid controlled apparatus including a chamber in which a piston can work, said chamber being in communication with said fluid flow passage downstream of said holes, whereby some of the driving gas, after passing through said holes, enters said chamber and displaces said piston, which in turn retracts said nozzle and closes said valve.

4. A combination according to claim 1 wherein the missile tank is provided with an automatically closing check valve the opening of which is produced by the insertion of said nozzle belonging to said fluid controlled apparatus.

References Cited
UNITED STATES PATENTS

| | | | |
|---|---|---|---|
| 2,441,363 | 5/1948 | Krueger | 137—614.03 X |
| 2,962,934 | 12/1960 | Seidner | 89—1.819 |
| 3,116,599 | 1/1964 | Campbell | 60—251 X |
| 3,340,691 | 9/1967 | Mangum | 60—251 X |

SAMUEL W. ENGLE, *Primary Examiner.*

U.S. Cl. X.R.

60—39.48, 251; 89—1.819